(12) United States Patent
Register, III et al.

(10) Patent No.: US 6,636,673 B2
(45) Date of Patent: Oct. 21, 2003

(54) FIBER OPTIC RIBBON INTERCONNECTS AND BREAKOUT CABLES

(75) Inventors: James A. Register, III, Hickory, NC (US); Samuel D. Navé, Conover, NC (US); Martyn Easton, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 30 days.

(21) Appl. No.: 09/748,541

(22) Filed: Dec. 26, 2000

(65) Prior Publication Data

US 2003/0161596 A1 Aug. 28, 2003

(51) Int. Cl.$^7$ .................................................. G02B 6/44
(52) U.S. Cl. ........................ 385/105; 385/106; 385/110
(58) Field of Search ................................. 385/102–108, 385/110, 113, 114

(56) References Cited

U.S. PATENT DOCUMENTS

| | | | |
|---|---|---|---|
| 4,701,016 A | 10/1987 | Gartside, III et al. | 350/96.23 |
| 4,711,523 A | 12/1987 | Iri et al. | 350/96.23 |
| 4,810,395 A | 3/1989 | Levy et al. | 252/28 |
| 5,253,318 A * | 10/1993 | Sayegh et al. | 385/114 |
| RE34,732 E | 9/1994 | Iri et al. | 385/109 |
| 5,348,669 A | 9/1994 | Brauer et al. | 252/28 |
| 5,566,266 A * | 10/1996 | Nave et al. | 285/113 |
| 5,621,842 A | 4/1997 | Keller | 385/114 |
| 5,672,640 A | 9/1997 | Brauer | 523/173 |
| 5,802,231 A * | 9/1998 | Nagano et al. | 385/114 |
| 5,920,672 A * | 7/1999 | White | 385/110 |
| 6,028,976 A * | 2/2000 | Sato et al. | 385/114 |
| 6,141,473 A * | 10/2000 | Song | 385/114 |
| 6,160,940 A * | 12/2000 | Summers et al. | 385/110 |
| 6,192,178 B1 * | 2/2001 | Logan et al. | 385/109 |
| 6,321,013 B1 * | 11/2001 | Hardwick et al. | 385/114 |
| 6,327,409 B1 | 12/2001 | Chabot et al. | 385/114 |

FOREIGN PATENT DOCUMENTS

| | | | | |
|---|---|---|---|---|
| DE | 3131424 C2 | 12/1986 | | G02B/6/44 |
| GB | 2096343 A | 10/1982 | | G02B/5/14 |
| GB | 2215081 A | 9/1989 | | G02B/6/44 |
| JP | 02137810 A | 5/1990 | | G02B/6/44 |
| JP | 10-142462 | 5/1998 | | G02B/6/44 |

* cited by examiner

Primary Examiner—Akm Enayet Ullah
Assistant Examiner—Jerry T. Rahll
(74) Attorney, Agent, or Firm—Timothy J. Aberle

(57) ABSTRACT

A fiber optic interconnect cable having at least one optical fiber ribbon surrounded by a cable jacket with substantial hoop strength, the cable jacket having a top wall, a bottom wall, and sidewalls. The sidewalls being thicker than the top and bottom walls. The jacket being formed of a material having a hardness for cable performance characteristics, the hardness being between a Shore A hardness of about 85 and a Shore D hardness of about 70. Other embodiments include a core formed as a generally rod-shaped structure with a plurality of slots formed in an outer surface thereof. The plurality of slots extending generally lengthwise along the core and an outer jacket surrounding the core. At least one interconnect ribbon cable is disposed in at least one of the slots.

26 Claims, 3 Drawing Sheets

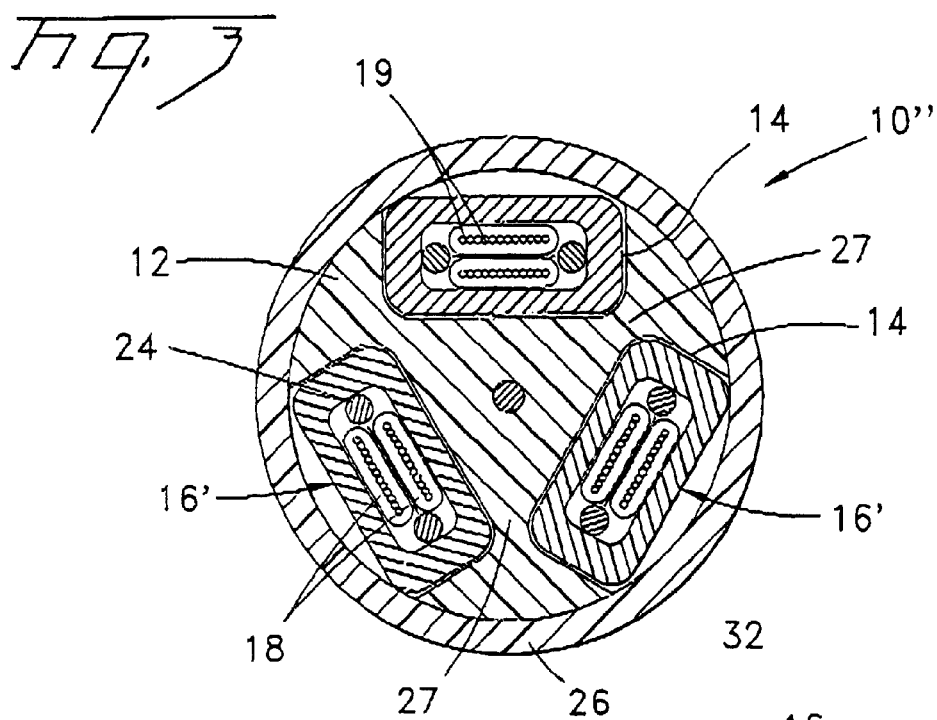
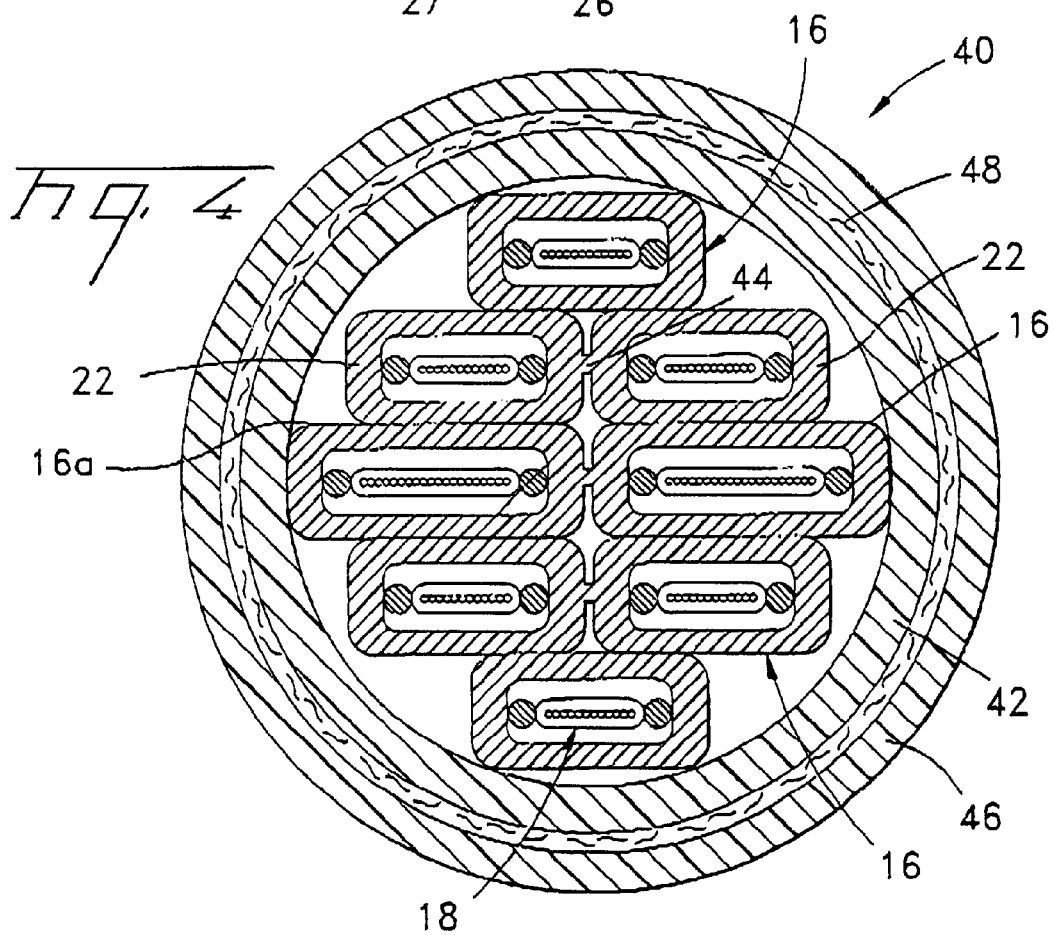

FIBER OPTIC RIBBON INTERCONNECTS AND BREAKOUT CABLES

FIELD OF THE INVENTION

The present inventions relate to fiber optic cables and, more particularly, to interconnect cables containing optical fiber ribbons and breakout cables having provisions for breaking one or more interconnects out of the cable so that optical fibers of the cable can be connected to various devices.

BACKGROUND OF THE INVENTION

Fiber optic cables of the type described above have been made with various constructions. One such cable includes an extruded plastic core having slots formed in its periphery, and a plurality of optical fiber ribbons disposed in each of the slots, a buffer tube being extruded over the ribbons, and a protective outer jacket being extruded thereover. The core can include a strength member embedded in its center. The slots typically extend helically such that the ribbons are stranded about the core. A drawback of this cable is that once a ribbon is broken out from the buffer tube it is relatively unprotected. Consequently, this cable is not particularly suitable for applications in which a broken-out ribbon may be subjected to considerable forces during routing of the ribbon or in operation, since the ribbon may be damaged or broken.

It would be desirable to provide a fiber optic breakout cable that facilitates protecting the ribbons broken out from the cable. It is also desirable to minimize the cross-sectional size of a fiber optic ribbon breakout cable. The cable size is reduced in general by increasing the packing density of fibers in the cable, such that a given number of fibers can be contained in a smaller cable.

SUMMARY OF THE INVENTION

The present invention provides interconnect cables and fiber optic ribbon breakout cables facilitating a high packing density and having features for protecting ribbons broken out from the cable. In one aspect of the invention, a fiber optic interconnect cable has a robust construction for reliable performance. In accordance with another aspect of the invention, the fiber optic cable comprises a core formed as a generally rod-shaped structure and having a plurality of slots formed in an outer surface of the core and extending generally lengthwise therealong, an outer jacket of tubular form surrounding the core, and at least one interconnect ribbon cable disposed in each of the slots of the core. Each interconnect ribbon cable comprises a tubular jacket defining an interior passageway and at least one optical ribbon disposed in the interior passageway of the tubular jacket. The fiber optic breakout cable in accordance with the invention can also include additional elements, such as one or more strength members, an armor layer, ripcords, and/or other features.

The core can be formed of a solid or a foamed polymer material. Various numbers of slots can be formed in the core, and the slots can all be of the same radial depth or can have different depths such that the deeper slots contain a greater number of optical fibers than the shallower slots. For example, the core can have shallow slots and deep slots arranged in an alternating fashion about the core's circumference, with the shallow slots each containing one interconnect ribbon cable and the deep slots each containing two interconnect ribbon cables.

Each interconnect ribbon cable can contain a plurality of ribbons arranged in a stack, if desired. Each ribbon can have from two to 36 fibers. A slip layer of low-friction tape or yarn can be provided between adjacent ribbons of a stack to facilitate relative sliding between the ribbons for enhancing optical performance. The interconnect ribbon cables can also include one or more strength members. Thus, the tubular jacket of a interconnect ribbon cable broken out from the cable provides protection to the ribbon(s) contained within the interconnect cable. Additionally, where the interconnect cable includes strength members, the interconnect cable is capable of withstanding tensile forces such as may be exerted in pulling the interconnect cable along a path during installation.

In accordance with another aspect of the invention, a fiber optic cable comprises a tubular outer jacket defining a central interior passageway therein, and a group of interconnect ribbon cables disposed in the interior passageway of the outer jacket, each interconnect ribbon cable comprising at least one optical ribbon and a tubular jacket surrounding the at least one optical ribbon. The plurality of interconnect ribbon cables includes at least one conjoined pair of interconnect ribbon cables having the tubular jackets thereof attached together in a manner allowing one of the interconnect ribbon cables to be separated from the other by breaking a connection between the tubular jackets of the interconnect ribbon cables. Preferably, the conjoined pair of interconnect cables are made by simultaneously extruding both tubular jackets of the two cables from a common die having a middle portion defining a web connecting the two jackets. The invention is not limited to having only two conjoined interconnect cables; three or more interconnect cables can be conjoined, if desired.

In one embodiment, there are a plurality of conjoined pairs of interconnect ribbon cables stacked together. A single interconnect ribbon cable can be arranged at each end of the stack to further increase the packing density of the cable.

The cable in accordance with the second aspect can also include a buffer tube surrounding the interconnect ribbon cables, with the outer jacket of the cable surrounding the buffer tube. If desired, strength yarns or the like can be disposed between the buffer tube and the outerjacket for increasing the strength of the cable.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 3 is a cross-sectional view of a fiber optic cable in accordance with a further embodiment of the present invention; and FIG. 4 is a cross-sectional view of a fiber optic cable in accordance with another embodiment of the present invention.

DETAILED DESCRIPTION OF THE INVENTION

The present inventions will be described more fully hereinafter with reference to the accompanying drawings, in which preferred embodiments of the inventions are shown. The inventions may, however, be embodied in many different forms and should not be construed as limited to the embodiments set forth herein; rather, these embodiments are provided so that this disclosure will be thorough and complete, and will fully convey the scope of the inventions to those skilled in the art. Like numbers refer to like elements throughout.

Figure 1:
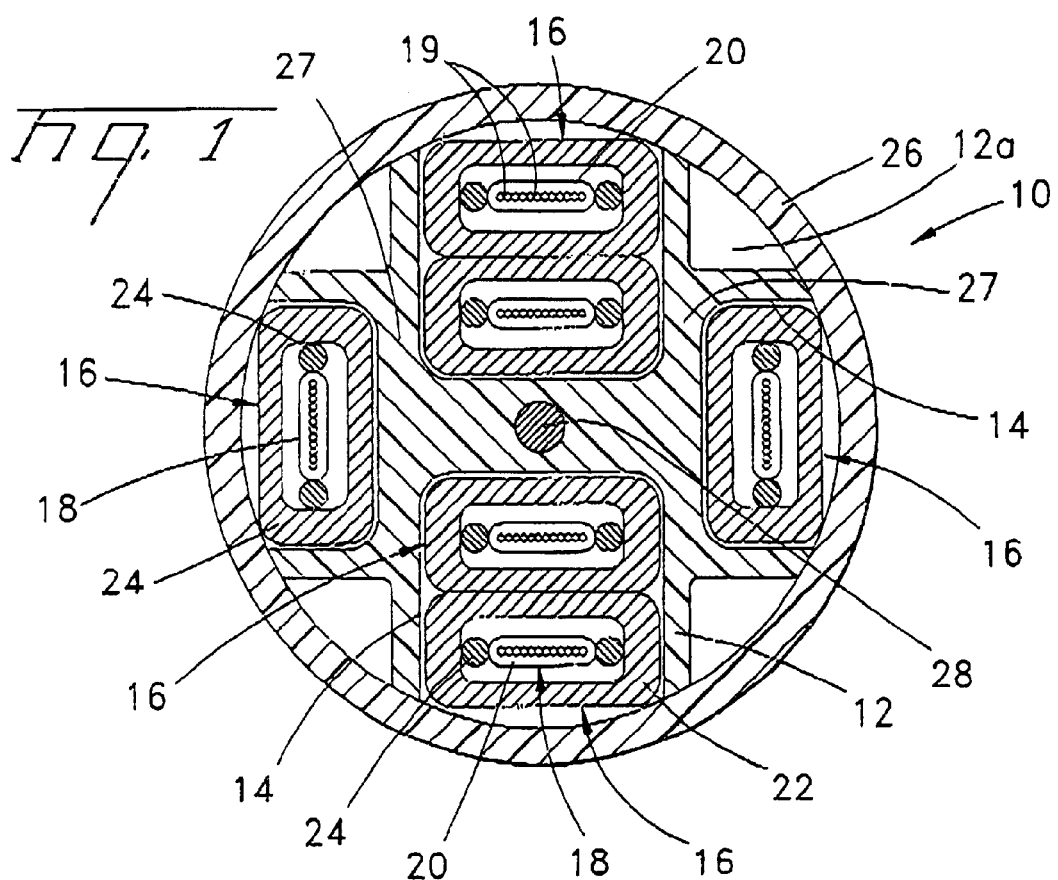
FIG. 1 is a cross-sectional view of a fiber optic breakout cable in accordance with an embodiment of the present invention.
Figure 1A:
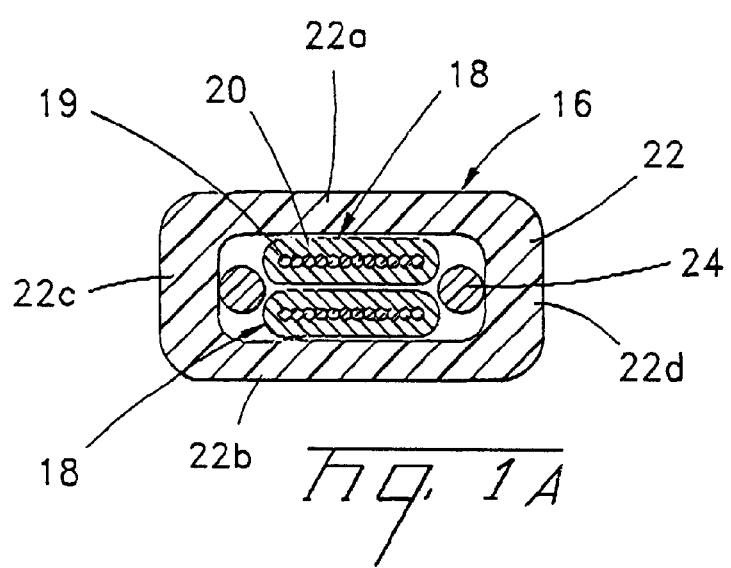
FIG. 1A is a cross sectional view of a interconnect cable in accordance with the present invention.

Preferred embodiments of the breakout cable inventions, illustrated in FIGS. 1 and 2–4, contain at least one interconnect ribbon cable 16, as illustrated in FIG. 1A, that includes at least one optical fiber ribbon 18. Interconnect cable 16 is robust enogugh to be used as a stand-alone cable. In the embodiment of FIG. 1, fiber optic ribbon cable 10 includes a core 12 that is formed in a suitable fashion, such as by extrusion, to have a rod-shaped configuration. Core 12 extends along the length of cable 10. Core 12 preferably is formed of a polymer material. The cost and weight of core 12 can be reduced by making core 12 of a foamed polymer material, which also improves the flexibility and low-temperature contraction performance of core 12, but a solid polymer material can also be used if desired. Suitable non-limiting examples of preferred polymers that can be used for forming core 12 include various polyolefins, polyvinyl chloride (PVC), polyvinylidene fluoride (PVDF), fiber-reinforced polyethylene (FRPE), and the like. Where flame performance is required, core 12 is preferably formed of a flame-retardant material; preferably, foamed PVC, PVDF, FRPE, or similar flame-retardant materials.

Core 12 defines a plurality of slots 14 extending in a depth direction radially into the core and circumferentially spaced about the core. Slots 14 extend generally longitudinally along the length of core 12, and preferably are unidirectionally helically made or are formed according to an alternating helix.

FIG. 1A shows the preferred interconnect ribbon cable 16 having at least one but more preferably two or more optical fiber ribbons 18 therein. Optical fiber ribbons 18 preferably include, for example, 2 to 36 optical fibers 19 bound together in a generally planar array within a preferably UV curable acrylic matrix 20. Optical ribbon 18 can be sub-unitized, for example, two optical fiber interconnects can be surrounded by a common matrix coating. Ribbon identification can be accomplished by printing cable jacket 22; however, printing of the ribbon is also contemplated. A preferred optical fiber 19 includes a silica-based core that is operative to transmit light and is surrounded by a silica-based cladding having a lower index of refraction than the core. A soft primary coating surrounds the cladding, and a relatively rigid secondary coating surrounds the primary coating. Optical fibers 19 can be, for example, single-mode or multimode optical fibers made commercially available by Corning Incorporated.

A jacket 22, preferably formed of an extrudable, flame retarded PVC, surrounds optical ribbons 18. Jacket 22 preferably includes top and bottom walls 22a,22b and side walls 22c,22d. For cable performance characteristics, a preferred material hardness for the jacket material is a Shore A hardness of about 85 to a Shore D hardness of about 70. In the preferred embodiments, the hardness range is a Shore A hardness of about 90±3 to a Shore D hardness of about 66±3. Preferred dimensional attributes for interconnect cables 16 having two ribbons preferably include a total vertical free space between the ribbons and the inner surfaces of top and bottom walls 22a,22b of about 1.7 mm±25%, most preferably ±15%. The thicknesses of walls 22a,22b are about 0.6 mm±15%, most preferably ±10%; and the thicknesses of side walls 22c,22d are about 0.8 mm±15%, most preferably ±10%. Although jacket 22 is depicted as having a generally rectangular shape, it will be understood that the invention is not limited to any particular cross-sectional shape of jacket 22. The interconnect cables have surprisingly good hoop strength, as the jackets are formed of a material with a predetermined hardness and have controlled thicknesses, and the jacket envelops the optical ribbon(s) with a calculated amount of free space for avoiding undue stress.

In the preferred embodiment, interconnect ribbon cable 16 also includes one or more strength members 24 within the inner wall of jacket 22. Strength members 24 can be formed of various materials, non-limiting examples of which include metal, fiber-reinforced plastic such as glass-reinforced plastic or aramid-reinforced plastic, liquid crystal polymer, polycarbonate, fiberglass, polyester, or polyethylene. In the preferred embodiment, strength members 24 are tensile filaments, for example, each member 24 is a 2450 denier filament of aramid fibers.

Fiber optic cable 10 (FIG. 1) also includes a protective outer jacket 26 surrounding core 12 and interconnect ribbon cables 16. Outer jacket 26 is formed of a suitable polymer material, and is formed by feeding core 12 with interconnect cables 16 contained therein through the center of an extrusion die as the polymer material is extruded through an annular die slot surrounding the center, thus extruding jacket 26 over the assembly of core 12 and interconnect cables 16. Core 12 and outer jacket 26 are illustrated as having circular outer peripheries, but it will be understood that various other shapes can be used, such as oval, elliptical, etc.

Slots 14 in core 12 can be all of the same depth in the radial direction, or alternatively they can have different depths for accommodating different numbers of optical fibers, as illustrated in FIG. 1. In addition, slots 12a can be formed in core 12 for reducing the material requirements of the core. For example, as shown, core 12 can have four slots 14, two of which are relatively shallow and two of which are relatively deep. In the illustrated embodiment, the deep slots are approximately twice as deep as the shallow slots, and each deep slot accommodates two interconnect ribbon cables 16, while each shallow slot accommodates one interconnect ribbon cable 16. The deep and shallow slots alternate in the circumferential direction; in the particular embodiment of FIG. 1, the deep slots are generally diametrically opposite each other. Such an arrangement of deeper and shallower slots facilitates an increase in the packing density for cable 10 while maintaining adequate thickness of web portions 27 defined between slots 14 of core 12.

Cable 10 can also include a central strength member 28 embedded within core 12, if additional tensile strength is needed beyond that provided by core 12. Central strength member 28 is provided in core 12 by feeding strength member 28 through the die slot of an extrusion die as the polymer material making up core 12 is extruded from the die slot, thus embedding the strength member in the core. Central strength member 28 can be formed of various materials, non-limiting examples of which include liquid crystal polymer (LCP), polycarbonate, fiber-reinforced plastic (FRP) such as glass-reinforced plastic (GRP) or aramid-reinforced plastic (ARP), metal, and the like.

Figure 2:
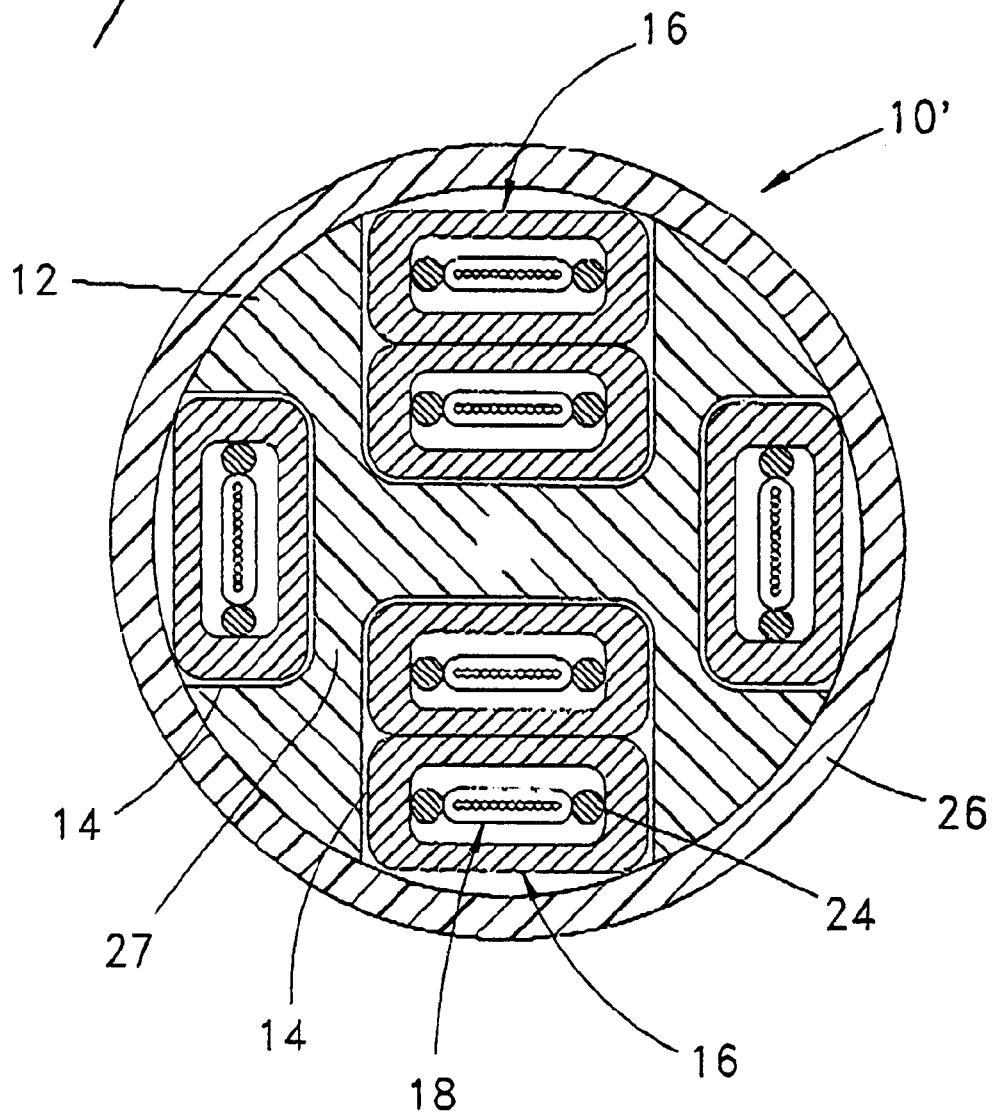
FIG. 2 is a cross-sectional view of a fiber optic cable in accordance with another embodiment of the present invention.

FIG. 2 depicts another preferred embodiment of the invention. The fiber optic cable 10' illustrated in FIG. 2 is generally similar to the first embodiment described above, except that the central strength member is omitted, and instead a number of strength elements 30 are embedded within the wall of outerjacket 26. Two such strength elements 30 are shown, but it will be understood that a different number of strength elements can be used depending on the particular strength requirements of a given application.

Another embodiment of the invention is shown in FIG. 3. The fiber optic cable 10" depicted in FIG. 3 is generally similar to the first embodiment described above, except that slots 14 in core 12 are all of the same depth and there are three slots instead of four. Each slot 14 accommodates a single interconnect ribbon cable 16', which differs from the interconnect cables earlier depicted in that a stack of two fiber optic ribbons 18 is contained within each interconnect ribbon cable 16'. Of course, a stack of more than two ribbons can be contained in each interconnect cable, if desired. Between adjacent ribbons 18 in a stack, a slip layer 32 can be provided to facilitate relative sliding movements between the ribbons for enhancing optical performance. Slip layer 32 can be formed by a tape or yarn of suitable material such as FEP or other material having a low coefficient of friction.

In the various fiber optic cables 10, 10', 10" described above, dimensions of core 12 and slots 14 will generally depend on what material is used for core 12 and its associated strength at webs 27, and will of course also depend on the sizes of interconnect cables 16.

Yet another embodiment of the invention is shown in FIG. 4. Cable 40 includes a plurality of interconnect ribbon cables 16 arranged in a group within the interior passageway of a buffer tube 42. Preferably, the group of ribbon cables includes one or more pairs of conjoined interconnect cables 16 whose jackets 22 are connected together by a web 44 of jacket material. For maximizing packing density, cable 40 can include interconnects with diverse fiber counts, for example, interconnects 16 can contain 12 fiber ribbons and interconnects 16a can contain 24 or 36 fiber ribbons. The conjoined interconnect cables 16 preferably are formed by extruding the jacketing material through a common die that includes a portion defining web 44. Web 44 is thick enough to provide sufficient strength to keep the two interconnect cables attached to each other during routine handling of the conjoined pair during manufacturing and assembly of cable 40, but web 44 can readily be severed to separate one interconnect cable 16 from the other one. In the illustrated embodiment of FIG. 4, there are three conjoined pairs of interconnect ribbon cables 16 stacked together, and additionally there is a single interconnect ribbon cable 16 on each end of the stack, making a total of eight interconnect cables each containing one ribbon 18. Of course, a different number of interconnect cables 16 could be used, and the number of ribbons contained in each interconnect cable can be varied, as appropriate for a given application. Furthermore, more than two interconnect cables 16 can be conjoined, if desired. Interconnect cables 16 preferably do not extend along a straight path within the central passageway of buffer tube 42, but instead are preferably stranded such that they each follow a generally helical path, thereby providing excess fiber length (EFL), which is beneficial in terms of optical performance.

Cable 40 also includes a protective outer jacket 46 surrounding optional buffer tube 42. Jacket 46 and buffer tube 42 are formed of suitable polymer materials. Preferably, cable 40 also includes strength yarns 48 disposed between buffer tube 42 and outerjacket 46. Strength yarns 48 can be formed of aramid or other suitable material. Instead of or in addition to strength yarns 48, cable 40 can include other strength members (not shown), such as strength members embedded in outer jacket 46 similar to the embodiment of FIG. 2. It will be understood that while cable 40 is shown as having a circular cross-section, various other cross-sectional shapes can be used instead. The dimensions of cable 40 will generally depend on the number and sizes of interconnect cables 16, the free space requirement inside buffer tube 42, and the strength requirements for the cable.

As evident from the foregoing description of certain preferred embodiments of fiber optic cables in accordance with the invention, the invention enables a high packing density to be achieved while at the same time providing protection for ribbons broken out from the cable.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Accordingly, what is claimed is:

1. A fiber optic interconnect cable, comprising: at least one optical fiber ribbon surrounded by a cable jacket with a predetermined hoop strength, said cable jacket having a top wall, a bottom wall, and a pair of sidewalls, said sidewalls being thicker than said top and bottom walls, and said jacket being formed of a material having a hardness for cable performance characteristics, said hardness being between a Shore A hardness of about 85 and a Shore D hardness of about 70, and a total vertical free space of about 1.7 mm±25%, the total vertical free space being defined as the distance between an inner surface of the top wall and the at least one optical ribbon plus the distance between an inner surface of the bottom wall and the at least one optical ribbon.

2. The fiber optic interconnect cable of claim 1, said sidewalls having a thickness of about 0.8 mm±15%.

3. The fiber optic interconnect cable of claim 1, said top and bottom walls having a thickness of about 0.6 mm±15%.

4. The fiber optic interconnect cable of claim 1, said jacket being formed of a flame retarded PVC.

5. The fiber optic interconnect cable of claim 1, the jacket formed of a material having a hardness range between a Shore A hardness of about 90±3 to a Shore D hardness of about 66±3.

6. A fiber optic cable, comprising:
   a core formed as a generally rod-shaped structure, the core having a plurality of slots formed in an outer surface thereof, and the plurality of slots extending generally lengthwise along the core, wherein the plurality of slots include at least one slot of relatively greater depth in a radial direction of the core than at least one other slot;
   an outer jacket surrounding the core; and
   at least one interconnect ribbon cable being disposed in at least one of the slots, the interconnect ribbon cable comprising a jacket defining an interior passageway and at least one optical ribbon disposed in the interior passageway of the jacket.

7. The fiber optic cable of claim 6, wherein the slots of the core are all of the same depth in a radial direction of the core.

8. The fiber optic cable of claim 6, each relatively deeper slot containing a greater number of optical ribbons than said at least one other slot.

9. The fiber optic cable of claim 8, wherein the core includes at least two relatively deeper slots and at least two relatively shallower slots, each shallower slot containing one interconnect ribbon cable and each deeper slot containing more than one interconnect ribbon cable.

10. The fiber optic cable of claim 6, wherein at least one interconnect ribbon cable contains a stack of optical ribbons.

11. The fiber optic cable of claim 6, wherein each interconnect ribbon cable includes at least one strength member.

12. The fiber optic cable of claim 6, wherein at least one interconnect ribbon cable contains a stack of at least two optical ribbons with a low-friction slip layer disposed between the optical ribbons of the stack for facilitating relative sliding between the optical ribbons.

13. The fiber optic cable of claim 6, wherein the core comprises a foamed polymer material.

14. The fiber optic cable of claim 6, wherein the core comprises a flame-retardant material.

15. The fiber optic cable of claim 6, wherein the slots extend helically about the core.

16. The fiber optic cable of claim 6, wherein the slots are s-z stranded about the core.

17. The fiber optic cable of claim 6, further comprising a longitudinally extending strength member embedded within the core.

18. The fiber optic cable of claim 6, further comprising at least one strength member embedded within the outer jacket.

19. A fiber optic cable, comprising:
   an outer jacket defining a central interior passageway therein; and
   a plurality of interconnect ribbon cables disposed in the interior passageway of the outer jacket, each interconnect ribbon cable comprising at least one optical ribbon and a jacket surrounding the at least one optical ribbon, the plurality of interconnect ribbon cables including at least one conjoined pair of interconnect ribbon cables having the jackets thereof attached together in a manner allowing one of the interconnect ribbon cables to be separated from the other by breaking a connection between the jackets of the interconnect ribbon cables.

20. The fiber optic cable of claim 19, further comprising a buffer tube having a side wall disposed between the outer jacket and the interconnect ribbon cables such that the interconnect ribbon cables are contained within the buffer tube.

21. The fiber optic cable of claim 20, further comprising strength members disposed between an inner surface of the outer jacket and an outer surface of the buffer tube.

22. The fiber optic cable of claim 21, wherein the strength members between the buffer tube and the outer jacket comprise strength yarns.

23. The fiber optic cable of claim 19, wherein each interconnect ribbon cable includes at least one strength member.

24. The fiber optic cable of claim 19, further comprising at least one strength member embedded within the outer jacket.

25. The fiber optic cable of claim 19, wherein there are a plurality of conjoined pairs of interconnect ribbon cables stacked together within the interior passageway.

26. The fiber optic cable of claim 25, further comprising at least one interconnect ribbon cable the jacket of which is not attached to any other interconnect ribbon cable.

* * * * *